United States Patent [19]

Blain

[11] 4,405,298
[45] Sep. 20, 1983

[54] MASA SHEETING APPARATUS

[75] Inventor: William A. Blain, Spring Valley, N.Y.

[73] Assignee: Nabisco Brands, Inc., Parsippany, N.J.

[21] Appl. No.: 369,509

[22] Filed: Apr. 19, 1982

[51] Int. Cl.³ ............... A21C 3/02; A21C 3/10; A21C 9/00
[52] U.S. Cl. .................. 425/308; 99/450.1; 425/363; 425/436 R; 426/389; 426/502; 426/503
[58] Field of Search ............ 99/450.1; 426/389 X, 426/502 X, 503 X; 425/225, 230, 406, 335, 363, 308, 436 R

[56] References Cited

U.S. PATENT DOCUMENTS 1,563,314 12/1925 Atanay ........................ 425/436
1,818,945 8/1931 Dell ............................. 425/230
3,590,745 11/1971 Palmer ......................... 425/363

Primary Examiner—Willard E. Hoag
Attorney, Agent, or Firm—Gerald Durstewitz; Richard Kornutik

[57] ABSTRACT

A masa sheeter having a sheeting roller provided with a plurality of hoops set in spaced circumferential grooves to carry scrap back into the sheeter infeed zone, a cutter acting against the roller to cut product pieces from the masa sheet between the hoops, and a tensioned flat rectangular wire band passing through said hoops and extending along the surface of the roller for peeling the product pieces from the roller.

14 Claims, 8 Drawing Figures

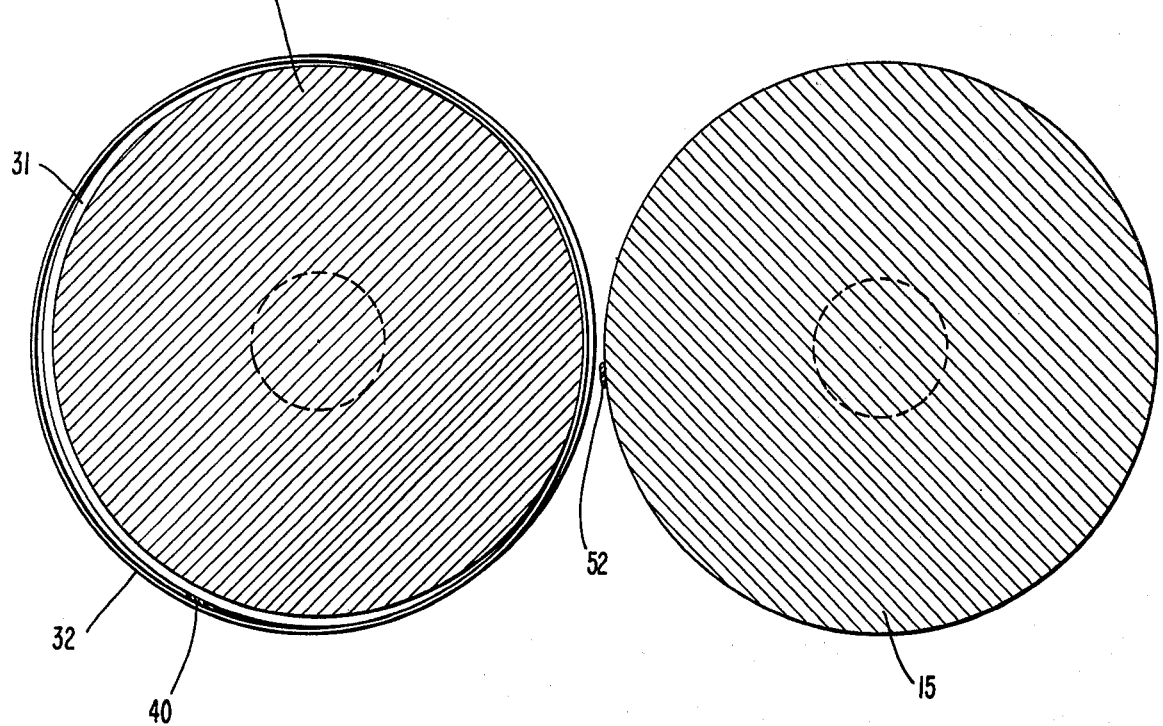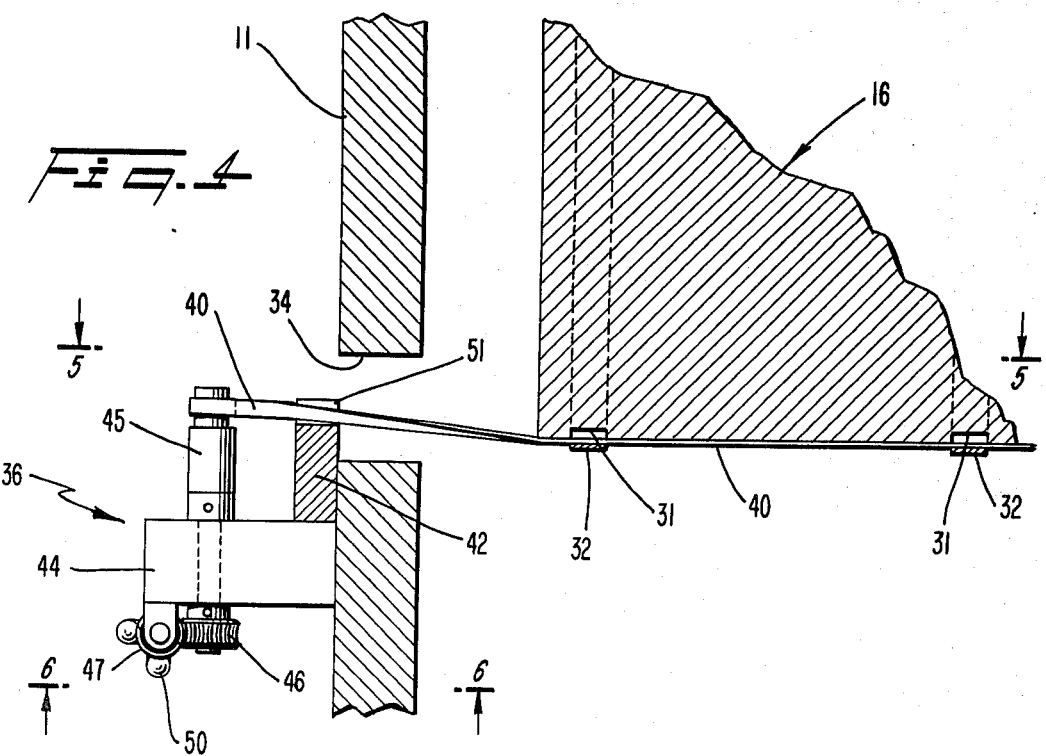

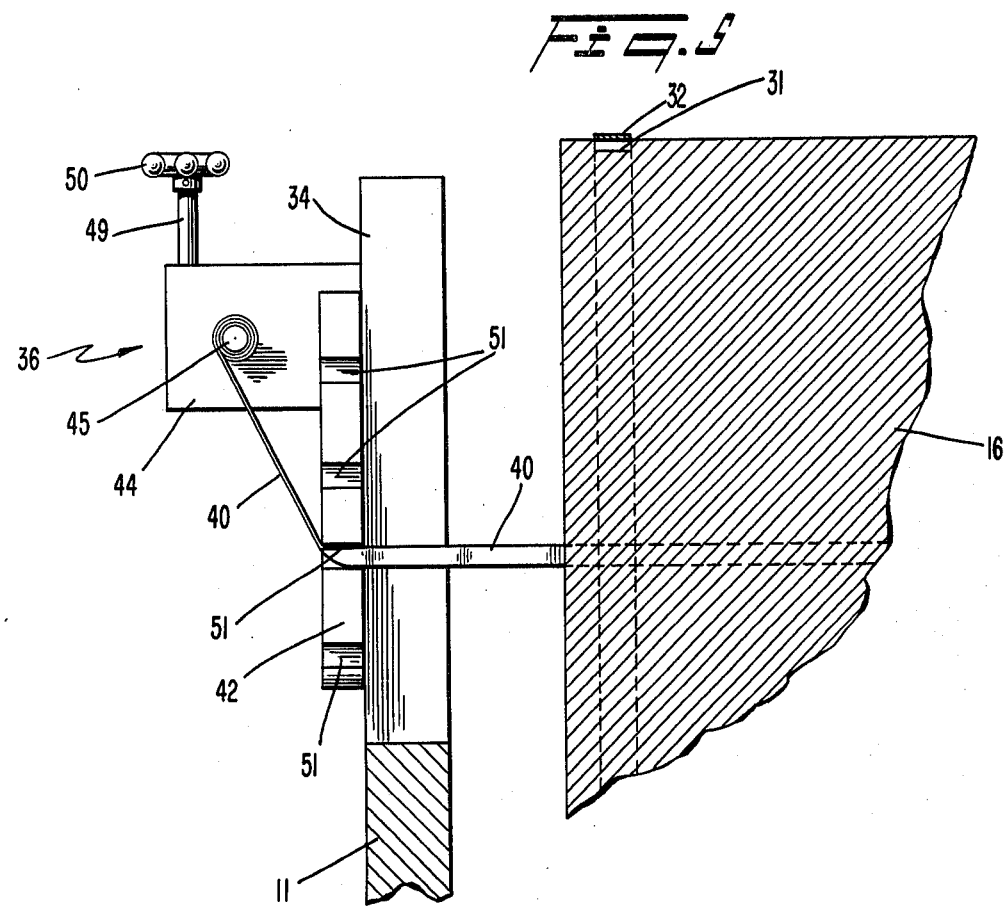
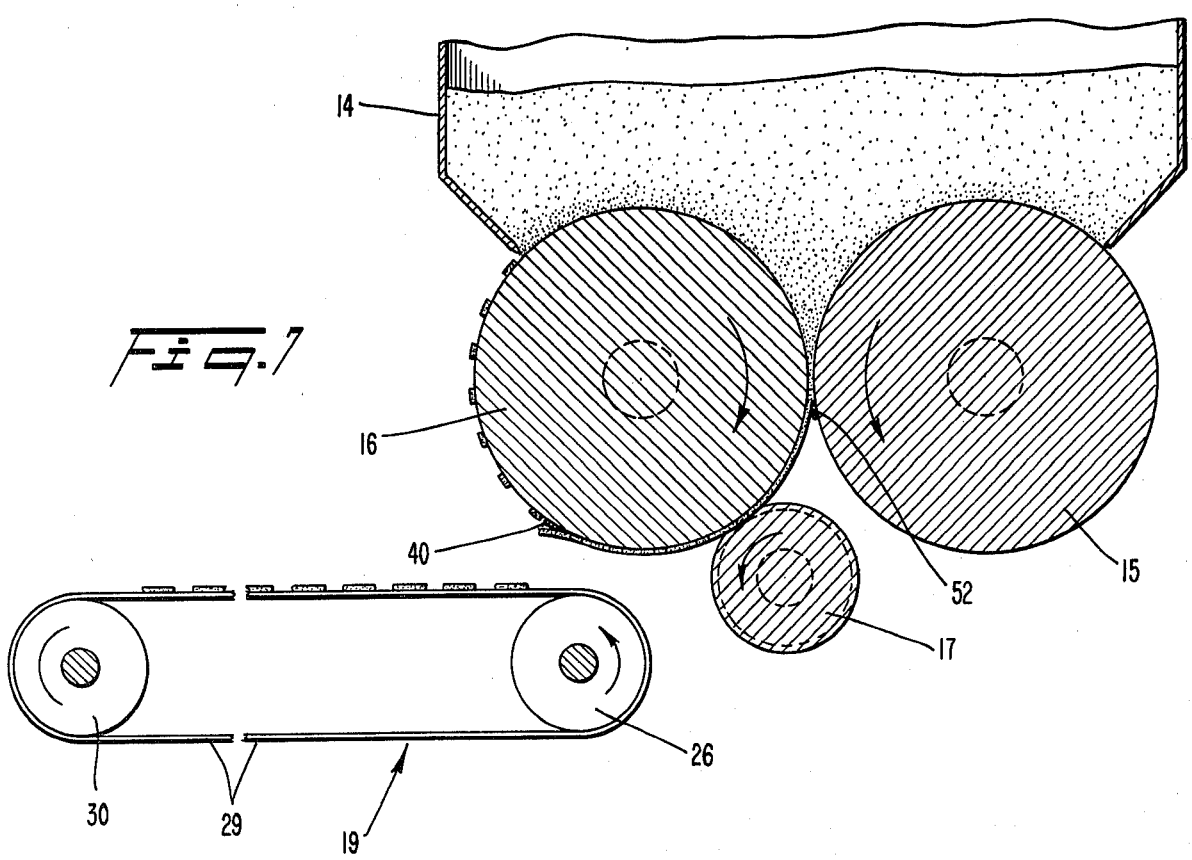

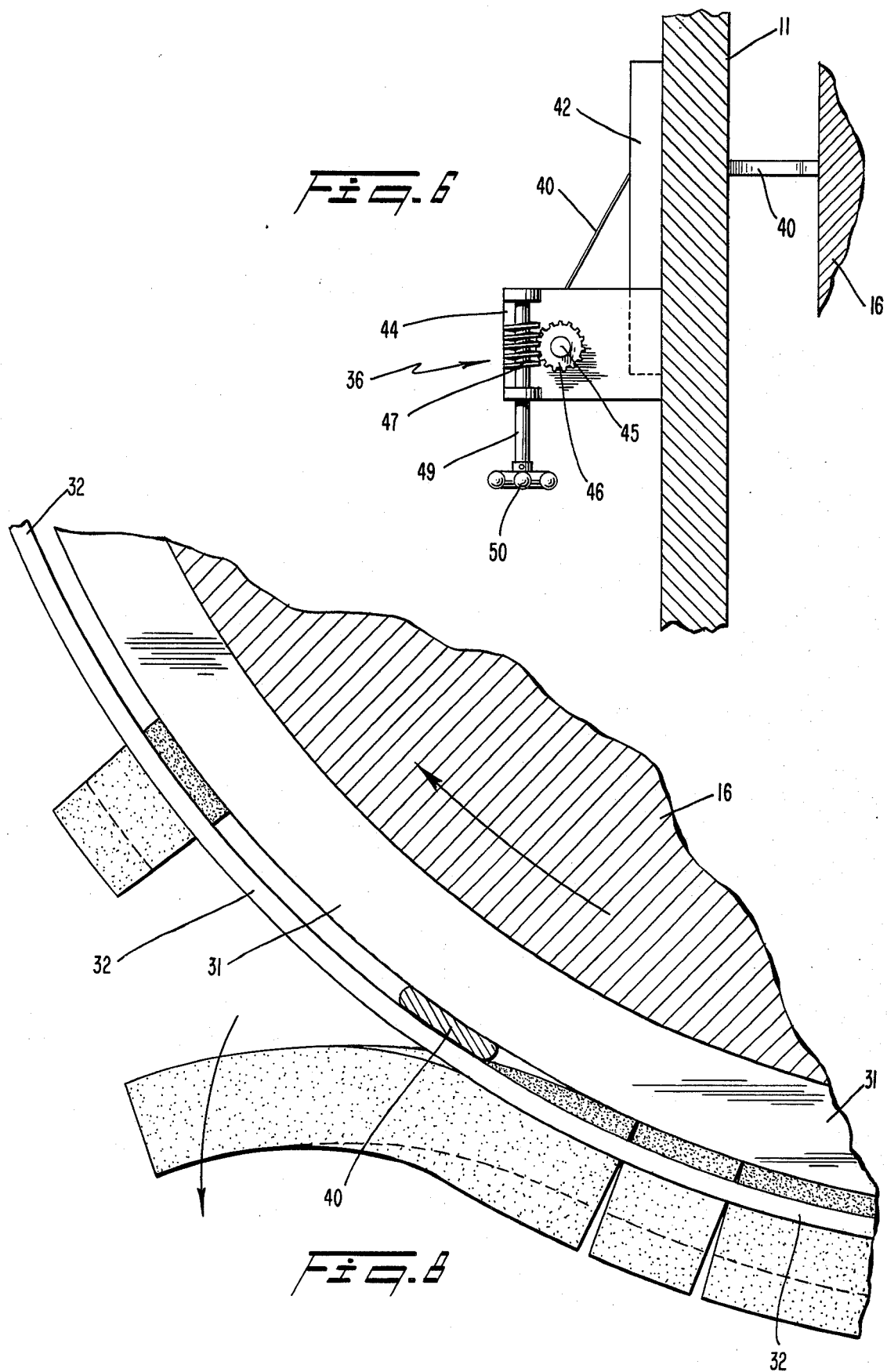

ND_ APPARATUS

BACKGROUND OF THE INVENTION

The present invention relates to masa sheeting apparatus and, more particularly, to such apparatus in which a wire is employed to peel the masa sheet from the sheeting rollers.

Masa sheeting machines are used in the production of thin corn products formed from unleavened cornmeal dough such as tortillas and tortilla chips. These machines have for decades comprised a pair of sheeting rollers positioned beneath a hopper. The masa squeezed between the rolls forms a sheet which adheres to the rollers. The sheet is peeled from one of the sheeting rollers by a wire so that the entire sheet is carried by the second roller. A cutting device acting against the second roller outlines product pieces in the sheet. A second peeling wire is provided to strip the masa sheet and the product pieces from the second roller after the cutting operation. The product pieces fall onto a take-away conveyor, but the scrap portions of the sheet are carried along with the roller back into the hopper by thin hoops fitted to the roller.

The second roller is provided with spaced circumferential grooves in which the hoops are loosely positioned. The hoops are formed in place from bands having adjustably interlocking ends. The formed hoops have a diameter slightly less than that of the roller so that they remain captive within the grooves. The grooves are sufficiently deep to allow the hoops to assume eccentric positions in which they protrude from the grooves a significant distance.

As the masa sheet is formed between the sheeting rollers, the masa is pressed against the hoops as well as the cylindrical surfaces of the rollers. Therefore, the masa sheet adheres to the hoops also. The second peeling wire is threaded through the hoops so that as the wire peels the masa sheet from the surface of the roller, the sheet continues to adhere to the hoops and the cut pieces are severed from the sheet and fall onto the take-away conveyor as the sheet is peeled from the roller, but the remainder of the sheet (the scrap) is carried by the hoops back into the hopper. For the decades that this type of machinery has been in operation, piano wire or similar high tensile strength round wire has been used exclusively as the peeling wires. The preferred wire size is 0.014 inch in diameter. Wire of 0.016 inch diameter is also used, although it does not peel as well as the thinner wire. Over these decades of use, there has been a consistent pattern of breakage of the peel wires. The wires used to peel the cut masa sheet from the second sheeting rollers break after an average of about 8 hours of use. The wires used to peel the masa sheet from the first sheeting rollers break after an average of about 32 hours of use. Each machine has a double set of sheeting rollers and, therefore, on the average 2½ wires must be replaced per machine during each eight-hour work shift. Replacement of each wire requires 15 to 20 minutes, during which time the machine is inoperative. Therefore, up to 50 minutes of an eight-hour shift is conventionally lost.

Therefore, on the average, each machine is idle for 30 to 50 minutes during each eight-hour shift with a resulting loss of up to 10% of production.

SUMMARY OF THE INVENTION

It is an object of the present invention to provide an improvement in masa sheeting apparatus which severely reduces lost production time resulting from the breakage and replacement of peeling wires.

The object of the present invention is accomplished by using in masa sheeting apparatus a peeling wire in the form of a flat band.

BRIEF DESCRIPTION OF THE DRAWINGS

A preferred embodiment of the invention has been chosen for purposes of illustration and description and is shown in the accompanying drawings, forming a part of the specification wherein:

FIG. 3 is a sectional view taken along line 3—3 on FIG. 2;

FIG. 4 is a sectional view taken along line 4—4 on FIG. 1;

FIG. 5 is a view taken along line 5—5 on FIG. 4;

FIG. 6 is a view taken along line 6—6 on FIG. 4;

FIG. 7 is a schematic sectional view taken along the line 7—7 on FIG. 2 and illustrating the general operation of the masa sheeting apparatus.

FIG. 8 is an enlarged view of a portion of FIG. 7, illustrating the peeling wire of the present invention in operation.

DESCRIPTION OF THE PREFERRED EMBODIMENT

Figure 1:
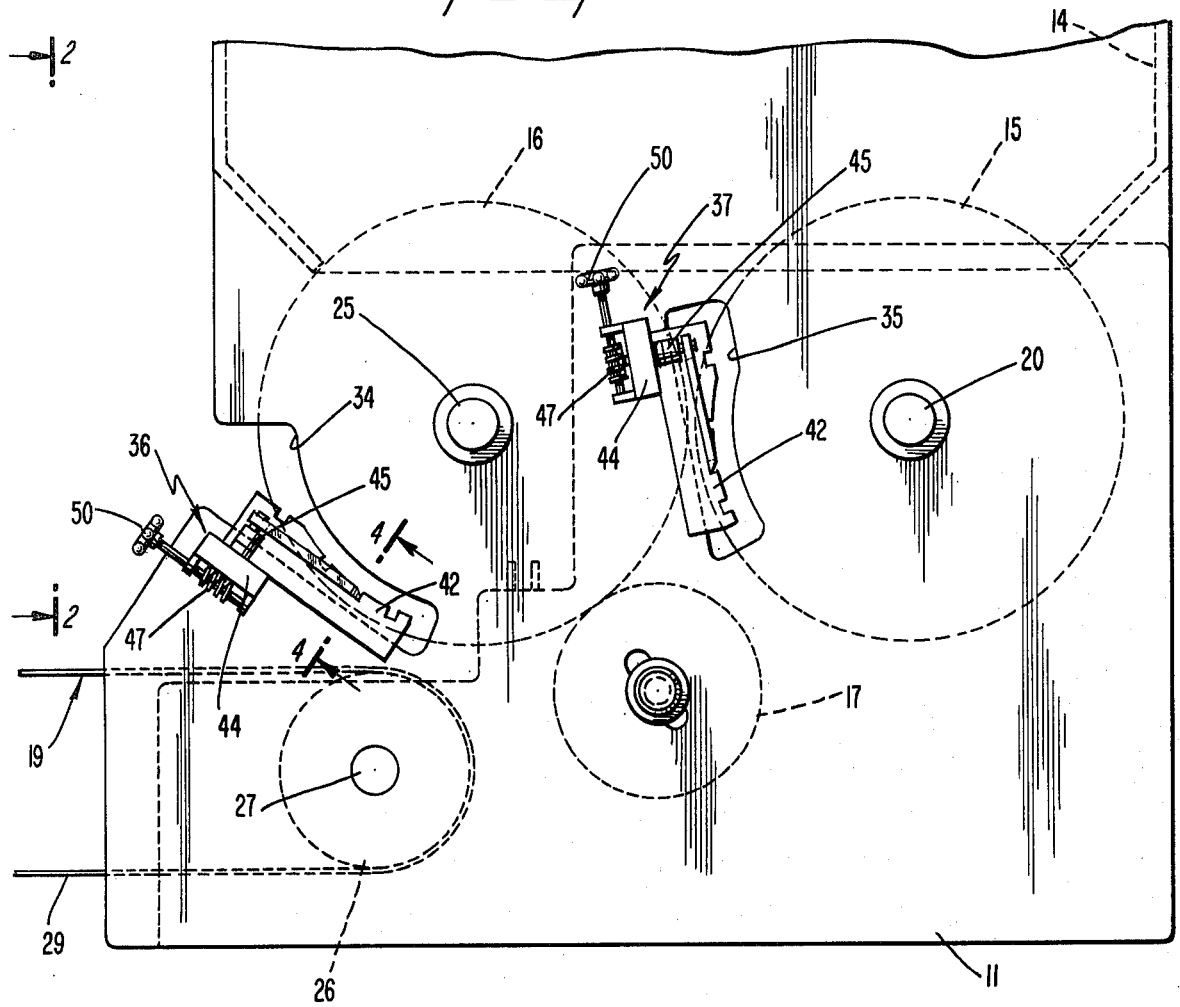
FIG. 1 is a side elevational view illustrating the general arrangement of a masa sheeting apparatus embodying the present invention.

Referring to the drawings in detail there is shown a masa sheeting machine 10 embodying the present invention. The sheeter 10 is a dual machine, having two essentially identical assemblies located side by side within a single frame structure. For purposes of simplicity, only one assembly is shown in the drawing except in FIG. 2 where a portion of the second assembly is illustrated. Also for purposes of simplicity, only those elements of the machine are shown which must be described in order to impart a full understanding of the invention; for example, the conventional gear train used to drive the elements of the machine is not disclosed.

The masa sheeting machine 10 includes side frame plates 11 (one of which is shown) and a center frame plate 12 (FIG. 2) which together support the elements that make up the two assemblies.

The assembly shown, comprises a hopper 14, a pair of sheeting rollers 15 and 16, a rotary cutter 14, and a take-away conveyor 19.

The roller 15 has a smooth uninterrupted cylindrical surface and is mounted on an axial shaft that is journalled on one end in a bearing 20 carried by the frame plate 11 and on the other end in a bearing (not shown) carried by the center frame plate 12. The second roller 16 is joined by a thick shaft 21 to the second roller 22 of the other sheeting assembly. A short shaft 24 extending from the roller 16 is journalled in a bearing 25 positioned in the frame plate 11. A similar arrangement (not shown) is provided on the opposite end of the roller 22 to complete the supporting arrangement of the dual rollers 16 and 22.

The conveyor 19 includes a roller 26 extending between the center frame plate 12 and the side frame plate 11, and journalled in bearings 27 mounted in the frame plates. An endless conveyor band 29 extends from the roller 26 to a second roller 30 (FIG. 7) to carry the product to the next production operation.

The second roller sheeting 16 is formed with spaced circumferential grooves 31 of generally rectangular cross-section, as shown in FIG. 34. In each of these grooves a thin steel hoop 32 is positioned. The hoops are formed in place from bands having adjustably interlocking ends. The hoops are formed to have a diameter slightly less than that of the roller 16 so that they remain captive within the grooves.

The frame plate 11 is provided with a recess 34, extending along the edge of the roller 16 and an opening 35 adjacent the edge of the roller 15. Peeling wire tensioning mechanisms 36 and 37 are mounted on the outer surface of the frame plate 11 adjacent to the recess 34 and the opening 35 respectively.

Figure 2:
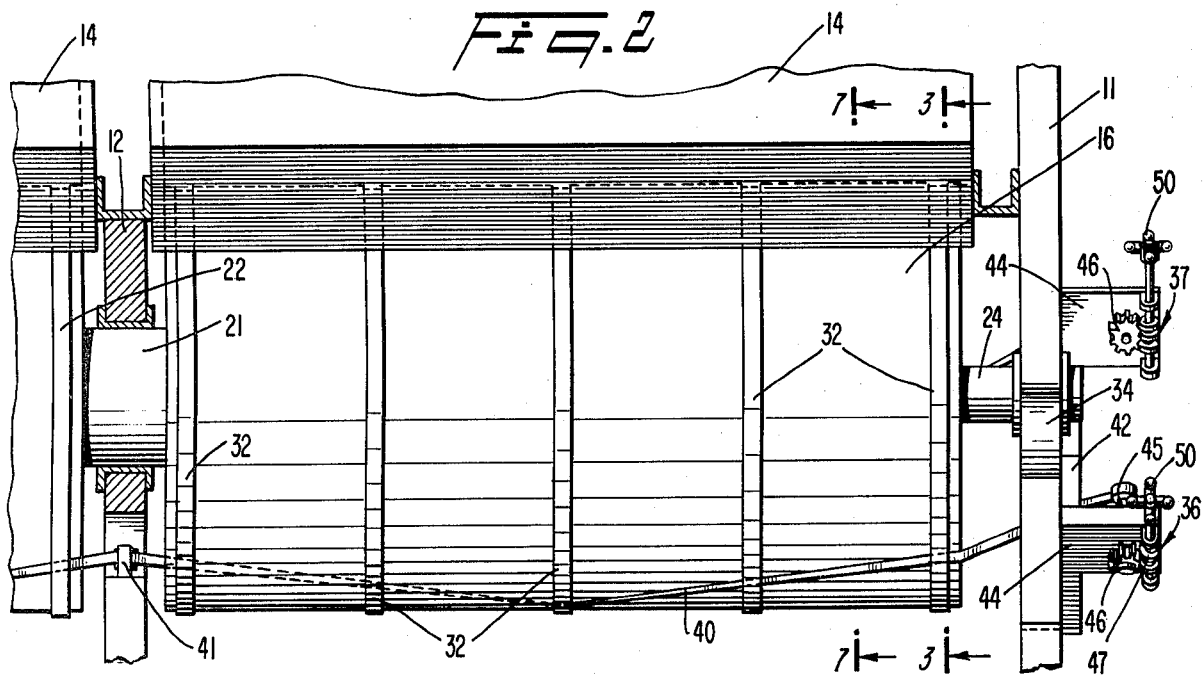
FIG. 2 is an elevational view taken along line 2—2 on FIG. 1.

Referring to FIG. 2, a peeling wire 40 extends from a peg 41 mounted on the center frame plate along the surface of the roller 16 in a gentle spiral to the tensioning mechanism 36. The peeling wire 40 passes through the hoops 32 as shown in FIGS. 2, 3, 4, and 8. At the point where the wire 40 passes under each hoop, the hoop protrudes from the groove 31.

The tensioning mechanisms 36 and 37 each include a guide plate 42, a block 44 perpendicular to the plate 42, a tensioning peg 45 extending through the block and having a worm-drive gear 46 mounted on the end thereof, and a hand operated worm gear 47 having a shaft 49 and handle 50 connected thereto.

The guide plate 42 is formed with a number of slots 51 therein and when the peeling wire 40 is installed it is set into one of these slots and then wrapped around the tensioning pet 45. The handle 50 is used to drive the worm gear 47 and rotate the peg 45 to tension the wire sufficiently to produce a good peeling action, a very sticky masa requiring more tension than a drier masa.

In accordance with the present invention the peeling wire 40 has a flat band form and is installed so that the large widthwise surface lies flat against the cylindrical surface of the second roller. In the preferred embodiment, the flat band is formed by rolling a round wire and, therefore, the band has rounded edges as shown in FIG. 8.

The slots 51 are enlarged to receive the width of the peeling wire band. The band is laid flat in the slots 51 and twisted 90 degrees before being wrapped around the tensioning peg 45.

Another flat wire band 52 (see FIG. 3) extends along the surface of the first sheeting roller 15 between an attachment (not shown) provided on the center frame plate 12 and the tensioning mechanism 37. As shown in FIG. 7, the masa sheet formed by the sheeting rolls 15 and 16 is peeled from the roller 15 by the peeling wire 52. The rotary cutter cuts product pieces from the masa sheet, however, both the cut pieces and the remainder of the sheet continue to adhere to the surface of the roller 16 and to the outer surfaces of the hoops 32. As shown in FIG. 8, the peeling wire 40 separates the cut product pieces and the remainder of the sheet from the surface of the roller 16. The product pieces fall onto the take-away conveyor 19. The scrap masa sheet however continues to adhere to the surface of the hoops 32 which are protruding from their grooves. The hoops thus carry the scrap masa sheet back into the hopper.

In the sheeting machine 10, the roller 16 has a diameter of about 6.5 inches and a length of about 15 inches. Peeling wire bands of stainless steel having a thickness of 0.010 inch and a width of 0.062 inch were installed in the sheeting machine and the machine was operated in a noncommercial test run held under normal production conditions for one eight-hour shift per day, five days a week, for two weeks. During this two-week period not a single peeling wire broke or was replaced for any reason. During such a period, if prior art peeling wires were used, it would have been necessary to replace 20 wires on the second rollers and several on the first rollers. In addition the wire bands 40 and 52 peeled the masa sheet from the rollers 15 and 16 more throughly than did the prior art round piano wires.

The invention is not limited to masa sheeting machines with rollers of a particular size. Other masa sheeters have rollers of 8 inch and 10 inch diameter. The present invention will provide the same efficacious results on machines with rollers of these or greater dimensions.

It will be seen from the foregoing that the present invention provides an improvement in masa sheeting apparatus which severly reduces lost production time resulting from the replacement of peeling wires.

I claim:

1. In masa sheeting apparatus comprising a hopper for receiving masa, first and second driven rollers positioned beneath said hopper in closely spaced relationship to form a masa sheet, means for separating said masa sheet from said first roller, a cutting member acting against said second roller for cutting said masa sheet, a take-away conveyor, and a tensioned wire extending along the surface of said second roller above said second roller, the improvement comprising said second tensioned wire being a flat band having a width and a thickness, the widthwise surface thereof being held flat against the surface of said second roller.

2. Apparatus according to claim 1 wherein the width of said band is about six times greater than the thickness thereof.

3. Apparatus according to claims 1 and 2 wherein the thickness of said band is about 0.010 inch.

4. Apparatus according to claim 3 wherein the width of said band is about 0.062 inch.

5. Apparatus according to claim 4 wheein said second roller is at least about 6 inches in diameter.

6. Apparatus according to claim 5 wherein said second roller is at least about 15 inches long.

7. Apparatus according to claim 4 wherein said band has a generally rectangular cross-section with rounded edges.

8. In masa sheeting apparatus comprising a hopper for receiving masa, first and second driven rollers positioned beneath said hopper in closely spaced relationship to form a masa sheet, means for separating said masa sheet from said first roller, said second roller having spaced circumferential grooves and hoops loosely positioned in said grooves, said hoops having an outside diameter about equal to that of said second roller between said grooves, a cutting member acting against said second roller for cutting said masa sheet between said grooves, a take-away conveyor, and a tensioned wire passing through said hoops and extending along the surface of said second roller above said take-away conveyor for separating said cut masa sheet from said second roll, the improvement comprising said second tensioned wire being a flat band having a width and a thickness, the widthwise surface thereof being held flat agianst the surface of said second roller.

9. Apparatus according to claim 8 wherein the width of said band is about six times greater than the thickness thereof.

10. Apparatus according to claims 8 and 9 wherein the thickness of said band is about 0.010 inch.

11. Apparatus according to claim 10 wherein the width of said band is about 0.062 inch.

12. Apparatus according to claim 11 wherein said second roller is at least about 6 inches in diameter.

13. Apparatus according to claim 12 wherein said second roller is at least about 15 inches long.

14. Apparatus according to claim 11 wherein said band has a generally rectangular cross-section with rounded edges.

* * * * *